US008870998B2

(12) United States Patent
Nolte et al.

(10) Patent No.: US 8,870,998 B2
(45) Date of Patent: Oct. 28, 2014

(54) METHOD FOR PRODUCING METAL NANOPARTICLES AND NANOPARTICLES OBTAINED IN THIS WAY AND USE THEREOF

(75) Inventors: Ulrich Nolte, Kleve (DE); Michael Berkei, Haltem am See (DE); Thomas Sawilowski, Essen (DE)

(73) Assignee: BYK-Chemie GmbH, Wesel (DE)

( * ) Notice: Subject to any disclaimer, the term of this patent is extended or adjusted under 35 U.S.C. 154(b) by 597 days.

(21) Appl. No.: 13/139,366

(22) PCT Filed: Nov. 20, 2009

(86) PCT No.: PCT/EP2009/008289
§ 371 (c)(1),
(2), (4) Date: Oct. 31, 2011

(87) PCT Pub. No.: WO2010/066335
PCT Pub. Date: Jun. 17, 2010

(65) Prior Publication Data
US 2012/0037041 A1 Feb. 16, 2012

(30) Foreign Application Priority Data

Dec. 12, 2008 (DE) .......................... 10 2008 061 703
Mar. 28, 2009 (DE) .......................... 10 2009 015 470

(51) Int. Cl.
*B22F 9/24* (2006.01)
*B82Y 40/00* (2011.01)
*B22F 1/00* (2006.01)
*B82Y 30/00* (2011.01)

(52) U.S. Cl.
CPC ......... *B22F 1/0022* (2013.01); *B22F 2304/054* (2013.01); *B22F 1/0062* (2013.01); *B22F 9/24* (2013.01); *B82Y 30/00* (2013.01); *Y10S 977/896* (2013.01)
USPC ................................ 75/371; 75/723; 977/896

(58) Field of Classification Search
None
See application file for complete search history.

(56) References Cited

U.S. PATENT DOCUMENTS

| 7,115,688 | B1 * | 10/2006 | Mirkin et al. ................. 526/127 |
| 7,138,468 | B2 * | 11/2006 | McCormick et al. ........... 526/89 |
| 2004/0180988 | A1 * | 9/2004 | Bernius et al. ................. 523/160 |
| 2007/0034052 | A1 * | 2/2007 | Vanheusden et al. ........... 75/362 |
| 2007/0045589 | A1 * | 3/2007 | Ittel ................................. 252/500 |
| 2008/0034921 | A1 * | 2/2008 | Vanheusden et al. ........... 75/362 |
| 2008/0272344 | A1 * | 11/2008 | Jiang et al. ..................... 252/513 |
| 2010/0035359 | A1 * | 2/2010 | Cormack et al. ............... 436/171 |

FOREIGN PATENT DOCUMENTS

WO   WO-2008/050109 A1 *  5/2008

* cited by examiner

*Primary Examiner* — George Wyszomierski

(57) ABSTRACT

The invention relates to a method for producing metal nanoparticles, wherein metal ions are reduced by means of at least one reducing agent in the presence of at least one polymer stabilizer and are converted into metal nanoparticles. The invention further relates to metal nanoparticles obtained in this way and to the use thereof.

12 Claims, No Drawings

US 8,870,998 B2

METHOD FOR PRODUCING METAL NANOPARTICLES AND NANOPARTICLES OBTAINED IN THIS WAY AND USE THEREOF

CROSS-REFERENCES TO RELATED APPLICATIONS

This application is a National Stage filing of International Application PCT/EP 2009/008289, filed Nov. 20, 2009, entitled METHOD FOR PRODUCING METAL NANO-PARTICLES AND NANOPARTICLES OBTAINED IN THIS WAY AND USE THEREOF claiming priority to German Applications DE 10 2008 061 703.2, filed Dec. 12, 2008 and DE 10 2009 015 470.1 filed Mar. 28, 2009. The subject application claims priority to PCT/EP 2009/008289, and to German Applications No. DE 10 2008 061 703.2 and DE 10 2009 015 470.1, and incorporates all by reference herein, in their entirety.

BACKGROUND OF THE INVENTION

The present invention relates to the technical field of nanotechnology.

More particularly, the present invention relates to a process for producing metal nanoparticles and to the metal nanoparticles obtainable in this way and to the use thereof. The present invention further relates to dispersions comprising the inventive metal nanoparticles. The present invention finally relates to coating materials and coating systems, glasses and vitreous coatings, inks including printing inks, plastics, foams, cosmetics, cleaning compositions and impregnating materials, adhesives, sealing compounds and catalyst systems which comprise the inventive metal nanoparticles or the inventive dispersions.

There are numerous descriptions of syntheses for production of metal nanoparticles both in the scientific literature and in the patent literature. In most cases, production is effected via the reduction of an appropriate metal salt.

For example, such metal nanoparticles can be produced via the reduction of a metal salt (for example of a silver salt) in a biphasic reaction with sodium borohydride as a reducing agent. This involves first transferring the metal salt using tetraoctylammonium bromide, for example, from the aqueous phase to the organic phase (e.g. toluene or chloroform) and then reducing it by means of sodium borohydride. According to the use of a stabilizer, for example dodecanethiol, it is possible to synthesize virtually monodisperse metal nanoparticles and, on the basis of surface modification, disperse them in various media. For use in water, a phase transfer catalyst is required in most cases, for example 4-dimethylaminopyridine. One disadvantage in the case of this reaction regime is the lack of extendability to the industrial scale ("upscaleability"). In addition, the metal nanoparticles produced in this way cannot be modified for polar systems. A further disadvantage of this method is the use of relatively expensive starting chemicals, the varying yields and the multitude of by-products formed, especially the high coarse component of particles.

One alternative is that of reactions in which the reduction likewise takes place in an aqueous medium. These involve reducing a metal salt, especially a gold salt, for example by means of sodium citrate (called the "citrate method" according to Turkevich; cf., for example, Discuss. Faraday Soc. 11 (1951), 55). The disadvantage of this method is that the metal or gold concentrations achievable during the synthesis and in the later sol are very low. In addition, the metal nanoparticles obtained in this way can be isolated as a powder only in a very complex manner at best, if at all. Equally disadvantageous are the relatively high temperatures.

A further alternative is called the polyol method (on this subject, cf., for example, US 2006/0090599 A1), this method involving performing a reduction of a metal ion source in or by means of a polyol at elevated temperatures above 100° C., generally above 150° C. The polyol serves simultaneously as a stabilizer and solvent, i.e. no additional solvent is required. However, a disadvantage of this method is that the metal nanoparticles obtained can be isolated as such only in a very complex manner at best, if at all. In addition, the metal, nanoparticles obtained can be modified for nonpolar systems only with difficulty, if at all. A further disadvantage is the use of relatively expensive starting chemicals and the relatively high process temperatures.

In addition, the production of metal nanoparticles, especially gold nanoparticles, is also possible in principle by what is called sonolysis, but generally only on the experimental scale. This process is based on energy input by means of ultrasound. This involves reacting an aqueous solution, for example of $HAuCl_4$, with glucose, the actual reducing agents being hydroxyl radicals and sugar pyrolysis radicals, which form at the interface region between the collapsing cavities of the glucose and the water. This results in what are called nanoribbons with widths of 30 to 50 nm and lengths of a few micrometers, these ribbons being flexible and being bendable to an extent of more than 90°. When glucose is replaced by cyclodextrin, a glycose oligomer, spherical gold nanoparticles are obtained. This method is relatively complex and cannot be applied to the industrial scale. In addition, relatively costly starting chemicals are used. Furthermore, this process can be performed, only with difficulty.

JP 2003-147418 A relates to the production of metal nanoparticles (e.g. Au or Pd) by reduction in micelles in aqueous media, the micelles being produced from amphiphilic block copolymers. The block copolymers needed for micelle formation are relatively complex to prepare and at the same time function as reducing agents.

US 2006/0266156 A1 relates to metal particles which comprise, on their surface, two different wetting agents or dispersants with different evaporation temperature, and a process for production thereof.

US 2006/0266157 A1 describes the production of metal nanoparticles by reduction of aqueous metal salt solutions in the presence of a wetting agent, for example cetyltrimethylammonium bromide (CTAB). The particles obtained in this way can be dispersed with addition of wetting agents or dispersants and combined with binders for coatings. The production is not effected in a purely aqueous medium. The reaction is a combination of citrate method on the one hand and biphasic reaction on the other hand. The coverage of the particle surfaces, for example with CTAB as a wetting agent, gives particles with good dispersibility in nonpolar media, but CTAB is relatively expensive and has to be used in a distinct excess. Furthermore, the addition of further dispersants is required in order to achieve a certain coating compatibility at all.

WO 2006/053225 A2 relates to the preparation of metal nanoparticle/protein complexes. The preparation is effected in an aqueous medium in the presence of proteins, such as BSA (bovine serum albumin), by reduction with $NaBH_4$. Polyvinylpyrrolidone-coated silver particles are also described; in this case, the synthesis is effected in glycerol by what is called the polyol method.

WO 2006/072959 A1 relates to aqueous-based dispersions of metal nanoparticles and to a process for production thereof in the presence of a reducing water-soluble polymer which enables metal formation to form metal cores.

US 2007/0034052 A1 and US 2006/0159603 A1 describe the production of metal nanoparticles, especially silver nanoparticles, by reduction of metal ions by means of polyols.

U.S. Pat. No. 6,992,039 B2 relates to the preparation of supported, monodisperse noble metal nanoparticles on oxidic substrates. More particularly, the in situ production of noble metal nanoparticles on porous ceramics is described. The noble metal salts are reduced in the presence of metal alkoxides and wetting agents, followed by a subsequent calcining step.

US 2003/0199653 A1 relates to the production of metal nanoparticles in an aqueous medium in the presence of sulfur-containing copolymers by reduction with $NaBH_4$. Owing to the use of sulfur-containing stabilizers, the particles obtained in this way are not usable for catalysis. Moreover, the synthesis is relatively complex. The re dispersibility of the particles obtained in this way is also not very great.

WO 02/087749 A1, CA 2 445 877 A1 and US 2004/0147618 A1 describe the production of silver nanoparticles in various media using gamma radiation or ultrasound in the presence of polymeric stabilizers.

BRIEF SUMMARY OF THE INVENTION

The problem underlying the present invention thus consists in the provision of a process for producing metal nanoparticles, which at least substantially avoids or else at least attenuates the above-outlined disadvantages of the prior art processes.

More particularly, it is an object of the present invention to provide a production process for metal nanoparticles which is flexible in terms of use and performance, works in an economically viable manner and also takes account of ecological demands.

To solve the problem outlined above, the present invention proposes a process according to claim 1; further advantageous configurations are provided herein.

The present invention further provides the metal nanoparticles obtainable by the process described herein; further advantageous configurations of this aspect of the invention are similarly provided.

In addition, the present invention provides, in yet a further aspect of the invention, for the use of the metal nanoparticles obtainable by the process according to the invention, as described below.

The present invention likewise provides dispersions of the inventive metal nanoparticles in a carrier or dispersion medium according to the description which follows.

Finally, the present invention further provides coating materials and coating systems, especially coatings, paints and the like, glasses and vitreous coatings, inks including printing inks, plastics, foams, cosmetics, especially nail varnishes, cleaning compositions and impregnating materials, adhesives, sealing compounds and catalyst systems, which comprise the inventive metal nanoparticles or the inventive dispersions.

It will be appreciated that particular configurations and embodiments which are described only in connection with one aspect of the invention also apply correspondingly in relation to the other aspects of the invention, without this being described explicitly.

It is otherwise the case that, in relation to the values, ranges, amounts and parameters which are still to be specified hereinafter, the person skilled in the art can optionally deviate therefrom based on the application or individual case, without leaving the scope of the present invention.

DETAILED DESCRIPTION OF THE INVENTION

The present invention provides—in a first aspect of the invention—a process for producing metal nanoparticles, in which metal ions are reduced by means of at least one reducing agent in the presence of at least one polymeric stabilizer and converted to metal nanoparticles. The result is dispersions of metal nanoparticles surface-modified or -coated with the polymeric stabilizer.

In the context of the present invention, the reducing agent brings about the reduction to elemental metal in the 0 oxidation state, while the polymeric stabilizer ensures that the metal particles formed are obtained as what are called nanoparticles, and more particularly cannot agglomerate any further or precipitate as an amorphous precipitate or the like.

The chemical progress of the process according to the invention can be illustrated by the following (partial) reaction equations, where "$Me^{n+}$" hereinafter denotes a metal, ion source with a metal in the formal oxidation state "n" where "n" generally denotes an integer from 1 to 8, especially 1 to 5, "Me" denotes the corresponding elemental metal, "Red" denotes the reducing agent which is converted to the corresponding oxidizing agent ("Ox") in the course of the process according to the invention, "PS" denotes the polymeric stabilizer, "$e^-$" denotes an electron and finally "$Me_{(Nano)}$–PS" denotes the resulting metal nanoparticles provided or modified with the polymeric stabilizer on their surface (=process end product):

$$Me^{n+} + n \cdot e^- + PS \rightarrow Me_{(nano)} - PS \tag{1}$$

$$Red \rightarrow Ox + n \cdot e^- \tag{2}$$

$$Me^{n+} + n \cdot e^- + PS + Red \rightarrow Me_{(nano)} - PS + Ox$$

Typically, the process according to the invention is performed in a liquid medium, preferably an aqueous medium. In general, for the purposes of conducting the reaction, the metal ions are dissolved in the medium in question or distributed ultrafinely in the form of salts. In other words, the process according to the invention is performed as a liquid phase process, especially as a single phase reaction. This is considered to be a crucial advantage over the prior art reactions outlined at the outset with two liquid phases.

Since, in the context of the present invention, especially in the case of use of hydrides as a reducing agent, not inconsiderable formation of foam can occur (formation of gaseous hydrogen), it may be advantageous to perform the process according to the invention additionally in the presence of at least one defoamer. For this purpose, it is possible to use defoamers known per se to those skilled in the art. The amount of defoamer may vary within wide ranges; typically, the defoamer is used in amounts of 0.0001 to 5% by weight, preferably 0.001 to 2% by weight, more preferably 0.01 to 1% by weight, based on the overall reaction mixture.

It is additionally possible also to add at least one additive to the reaction mixture. Additives suitable in accordance with the invention are, for example, selected from the group of pH modifiers, pH buffer substances, emulsifiers, rheology modifiers, preservatives, surfactants or the like.

In addition, at least one cosolvent may also be added to the reaction mixture. The amount of cosolvent(s) may likewise vary within wide ranges; typically, amounts of 0.01 to 10% by weight, more preferably 0.1 to 7% by weight, most preferably 0.5 to 5% by weight, of cosolvent(s) are used, based on the overall reaction mixture. The cosolvent may especially be selected from organic, preferably polar solvents such as alcohols, glycols (e.g. butylglycol etc.) or the like, or else from inorganic solvents such as acids or bases. For example, the cosolvents used may be inorganic acids or bases for metal salts as starting materials, for example $NH_3$ to achieve solubility of AgCl in water, which leads to the formation of $[Ag(NH_3)_2]Cl$, or HCl for $AuCl_3$ as a starting material, which leads in turn to the formation of $HAuCl_4$.

The process according to the invention can be performed over a wide temperature range. Since the process is performed as a liquid phase process, the lower limit of the temperature range results from the melting point of the reaction medium, and the upper limit from the boiling point thereof. In general, especially in the case of use of an aqueous medium, the process is performed within the temperature range of >0° C. and <100° C., especially 5 to 90° C., preferably 10 to 80° C., more preferably 10 to 40° C., most preferably 10 to 30° C. Lower temperatures have the advantage that more stable dispersions are generally obtained and, in addition, the nanoparticles obtained generally exhibit better redispersibility.

A further advantage of the process according to the invention is considered to be the relatively short process durations, which is highly advantageous specifically in the case of industrial scale performance, i.e. performance on the industrial scale. Typically, the process according to the invention is performed with a reaction time of <10 minutes, especially <5 minutes, preferably <1 minute, more preferably <0.5 minute. Advantageously, the process according to the present invention is performed with a reaction time in the range from 0.0001 to 10 minutes, especially 0.0001 to 5 minutes, preferably 0.0001 to 1 minute, more preferably 0.0001 to 0.5 minute. Typically, the actual reaction in the context of the process according to the invention is complete within a few seconds.

A further advantage of the process according to the invention is considered to be the high flexibility thereof in relation to the performability thereof. For instance, the process according to the invention can alternatively be operated either batchwise or else continuously. In the case of the batchwise procedure, the process according to the invention can be performed, for example, in a simple stirred tank. In the case of a continuous procedure, in contrast, the process according to the invention can be performed in a continuous stirred or tubular reactor, a continuous stirred tank cascade, or else in what is called a spinning disk-reactor. More particularly, continuous performance in what is called a spinning disk reactor gives the additional advantage of an extremely rapid conversion owing to very rapid and intensive mixing; for further details regarding process performance in a spinning disk reactor, reference may be made, for example, to WO 2006/018622 A1, WO 2006/040566 A1 and WO 2006/008500 A1, the entire disclosure content of each hereby being incorporated by reference.

In a particular embodiment, the process according to the invention can be performed in such a way that regulation of temperature and/or volume flows achieves a separation in time and/or space of the nucleation and growth processes; in this particular embodiment, the process according to the invention can be performed especially in what is called a micro reaction technology system. A particular advantage of this procedure is that a particularly homogeneous morphology and/or monodispersity of the resulting metal nanoparticles is achieved. For further details on this subject with regard to the corresponding process performance in this particular embodiment, reference may be made especially to WO 2008/061632 A1, the entire disclosure content of which on this subject is hereby incorporated by reference.

A further advantage of the process according to the invention is considered to be that it has a high flexibility in terms of the usability of the reducing agent used. The reducing agent should be selected such that it is capable of reducing the metal ion in question to be reduced to elemental metal (i.e. oxidation state: 0). More particularly, the reducing agent in the electrochemical voltage series possesses a lower standard potential than the metal of the metal ion to be reduced.

In addition, the reducing agent should be selected so as to be soluble or dispersible in the reaction medium. Reducing agents suitable in accordance with the invention are especially selected from the group of inorganic hydrides, especially sodium borohydride or lithium aluminum hydride; inorganic thiosulfates or thiosulfuric acid; inorganic sulfides or hydrogen sulfide; inorganic sulfites; hydrazines; hydroxylamines; hydrogen (for example gaseous hydrogen or hydrogen generated in situ, or nascent hydrogen); carbon monoxide; acetylene; oxalic acid or oxalates; citric acid or citrates; tartaric acid or tartrates; mono or polyhydric alcohols, for example glycol, or else hydroxy-functional polyglycol ethers; sugars; inorganic phosphides; and mixtures or combinations of at least two of the aforementioned reducing agents. Particular preference is given to inorganic hydrides, especially of the aforementioned type.

The amount of reducing agent used can equally be varied within wide ranges. More particularly, the reducing agent is used in a ratio of reducing agent to metal ions, calculated as the amount of electrons required for the reduction, in the range from 1.05:1 to 200:1, especially 1.1:1 to 100:1, preferably 1.1:1 to 50:1. The greater the aforementioned ratio, the more crystallization seeds are formed and the smaller the nanoparticles which form.

With regard to the particular metal of the metal ions to be reduced, this may in principle be any desired metal which can be converted in the desired manner under the inventive process conditions. More particularly, the metal is selected from at least one metallic element of groups III A to V A and I B to VIII B of the periodic table of the elements. The metal is preferably selected from the group of Cu, Ag, Au, Ni, Pd, Pt, Co, Rh, Ir, Ru, Os, Se, Te, Cd, Bi, In, Ga, As, Ti, V, W, Mo, Si, Al and/or Sn and mixtures, alloys and cocrystals of at least two of these elements. In a particularly preferred manner, the metal is selected from the group of Cu, Ag, Au, Ni, Pd, Pt, Co, Rh, Ir, Ru, Os, Se and/or Te and mixtures, alloys and cocrystals of at least two of these elements. Most preferably, the metal is selected from noble metals, especially Cu, Ag, Au, Ni, Pd, Pt, Ru, Ir and/or Rh, most preferably Ag, Au, Pd and/or Pt.

Alternatively, the nanoparticles obtained are based on at least two metals and are especially of the CdSe, CdTe, BiTe, GaAs, InAs, AgPd, CoPt and/or AgAu type. The metal nanoparticles here are thus at least binary metal nanoparticles. Such systems are of interest, for example, for semiconductor technology and catalyst technology.

The metal ions can in principle be used in any desired forms. It is possible to use all metal ion sources which are compatible in the context of the process according to the invention, and more particularly are soluble or dispersible in the reaction medium. For instance, the metal ions can be used especially in the form of metal salts (e.g. $AgNO_3$, $Na_2PtCl_4$, $NaAuCl_4 \cdot 2H_2O$ etc.), metal acids and hydrates thereof (e.g. $HAuCl_4 \cdot 3H_2O$, $H_2PtCl_4 \cdot 6H_2O$, $H_2PtCl_4$ etc.), ionic or covalent metal compounds (e.g. $AuCl_3$, $PtCl_2$, AgCl etc.), complexed metal ions and/or metal electrodes (e.g. in the case of electrolysis), preferably in the form of metal salts.

The amount of metal ions used can likewise vary within wide ranges. More particularly, the metal ions, based on the overall reaction mixture and calculated as the metal, are used in amounts of 0.0001 to 20% by weight, especially 0.001 to 15% by weight, preferably 0.005 to 10% by weight, more preferably 0.01 to 3% by weight, most preferably 0.1 to 2% by weight.

With regard to the size of the metal nanoparticles obtained, this may vary over wide ranges. More particularly, the metal nanoparticles obtained may have absolute particle sizes in the range from 0.3 to 1000 nm, especially 0.5 to 750 nm, preferably 1 to 500 nm, more preferably 2 to 100 nm, most preferably 3 to 50 nm. In general, the metal nanoparticles obtained have mean particle sizes (determined as what is called the D50 value) in the range from 1 to 500 nm, especially 2 to 200 nm, more preferably 2 to 100 nm, most preferably 5 to 40 nm.

The size and shape of the metal nanoparticles obtained can be varied by the appropriate variation of the reaction conditions. For example, by varying the type and/or the amount of the reducing agent and/or the type and/or the amount of the polymeric stabilizer and/or the reaction temperature and/or the mode of addition (single addition, stepwise addition etc.) or the like, the particle size can be influenced or adjusted in a controlled manner. This is known as such to those skilled in the art.

In a particular embodiment of the present invention, the metal nanoparticles obtained may have a bimodal particle size distribution. In the case of this particular embodiment, the mean particle diameters (D50) of the two fractions of metal nanoparticles may advantageously differ by at least 10 nm, especially at least 25 nm, preferably at least 50 nm, more preferably at least 75 nm, most preferably at least 100 nm. In this way, it is possible in the case of use of the metal nanoparticles in question as additives (for example in coatings, paints or other coating systems) to achieve particular effects, especially surface effects, especially with regard to the mechanical properties, such as mechanical stability, abrasion resistance, surface characteristics, gloss, etc. A bimodal particle size distribution can be achieved by controlled variation or adjustment of the reaction conditions, for example by the selection of the ratio of reducing agent to metal ions to be reduced, by the amount of polymeric stabilizer (e.g. lower or substoichiometric amounts of polymeric stabilizer), by stepwise and/or repeated addition of the individual reagents, etc. This is familiar as such to those skilled in the art.

With regard to the polymeric stabilizer, it can likewise be used within wide ranges of amount. More particularly, the polymeric stabilizer can be used in amounts of 1 to 1000% by weight, preferably 5 to 500% by weight, more preferably 10 to 200% by weight, most preferably 20 to 100% by weight, based on the resulting metal nanoparticles.

With regard to the chemical nature of the polymeric stabilizer, it is especially a polymeric dispersant or a polymeric wetting agent and/or a surfactant.

The molar mass of the polymeric stabilizer used may likewise vary within wide ranges. Typically, the polymeric stabilizer used has a mean, especially weight-average molecular weight of at least 1000 g/mol, preferably at least 1500 g/mol. In general, the polymeric stabilizer has a mean, especially weight-average molecular weight in the range from 1000 to 1 000 000 g/mol, especially 1250 to 100 000 g/mol, preferably 1500 to 75 000 g/mol, more preferably 2000 to 50 000 g/mol.

Advantageously, the polymeric stabilizer is based on a functionalized, especially acid- and/or base-functionalized, polymer, especially having polar functional groups. For example, the polymeric stabilizer may be selected from the group of functionalized polyamines, functionalized polyurethanes, functionalized poly(meth)acrylates, functionalized vinyl copolymers, functionalized polyether/polyester copolymers, functionalized polyethers, functionalized polyesters, functionalized fatty acid, copolymers, functionalized block copolymers and/or functionalized polyalkoxylates, and mixtures or combinations of at least two of these compounds.

Typically, the polymeric stabilizer may be based on a functionalized, especially acid- and/or base-functionalized, polymer, said polymer containing at least one functional group which may especially be selected from, hydroxyl (—OH), thiol (—SH), amine, ammonium, carboxyl, carbonyl, ester, ether, sulfonyl, phosphoric acid and/or phosphoric ester functions, preferably hydroxyl (—OH), thiol (—SH) and/or amine functions.

In the case of basic functionalization, the relevant base number of the polymer may especially be at least 10 mg KOH/g, especially at least 20 mg KOH/g, preferably at least 25 mg KOH/g, and, in the case of acidic functionalization, the acid number may especially be at least 10 mg KOH/g, preferably at least 25 mg KOH/g, more preferably at least 50 mg KOH/g. In the case of polymers with acidic and basic functionalization, both aforementioned values apply.

In a manner preferred in accordance with the invention, the polymeric stabilizer may be selected from the following dispersants and/or wetting agents as described in the publications cited below, the disclosure content of each hereby being incorporated, by reference:

polyurethanes according to EP 0 154 678 A and EP 0 318 999 A;
polyurethanes according to EP 0 270 126 A;
modified polyurethanes and polyamines according to EP 1 593 700 A;
salts of polyamines according to EP 0 893 155 A;
phosphoric esters according to EP 0 417 490 A;
branched polymers containing imidazole groups according to EP 1 081 169 A;
ethoxylates, especially alkoxylated epoxide/amine adducts, according to EP 1 650 246 A and epoxide adducts according to EP 1 486 524 A;
copolymers with fatty acid according to EP 1 640 389 A;
transesterified polyacrylates according to EP 0 879 860 A;
acid-functional polyesters according to WO 2005/097872 A;
block copolymers (gradient copolymers) according to EP 1 416 019 A.

The actual production of the metal nanoparticles may optionally be followed by a purification step. The purification can be effected in a manner known per se to those skilled in the art, and so no further details are required in this regard.

After the production, the metal nanoparticles obtained can be removed by methods known per se, which may optionally be followed by a process step for redispersion (for example in another medium). Alternatively, however, it is also possible to use the metal nanoparticle dispersions obtained as such, i.e. as obtained, directly after the production, since the metal nanoparticles in question are present in stable dispersion, especially with long-term stability.

The process according to the invention for producing metal nanoparticles is associated with a multitude of advantages, some of which are to be specified below in a nonlimiting manner:

The process according to the invention works inexpensively and economically viably and is additionally also performable directly on the industrial scale.

The process according to the invention can be configured extremely flexibly with regard to the process regime thereof. The process according to the invention can be operated batchwise or continuously. In the case of a batchwise procedure, it can be conducted, for example, in a stirred tank. In the case of a continuous procedure, the reaction can be performed, for example, in a continuous stirred reactor or tubular reactor, a continuous stirred tank cascade or a spinning disk reactor.

The relatively low process temperatures likewise contribute to process efficiency and process economy, and additionally meet the current ecological demands.

The process according to the invention is, moreover, performed in purely aqueous media, and is thus what is called a "green process" which can additionally be modified flexibly. The process is thus simple, inexpensive and ecologically compatible, and dispenses very substantially with organic solvents.

The metal nanoparticles obtained in the process according to the invention are isolable directly from the dispersion. Due to the stability of the dispersions, the dispersions, however, can also be used as such without any need to perform a preceding isolation of the metal nanoparticles.

The use of suitable dispersants or wetting agents as stabilizers allows broad compatibility and dispersibility of the metal nanoparticles obtained in a wide variety of different media (for example waiter, organic solvents, polymers, waxes, oils, glycols, etc.).

The dispersants or wetting agents used, can, if desired, be removed directly—either partly or else completely—(for example by displacement with more strongly binding ligands or else by thermal, light-induced, physical and/or chemical degradation, etc.). This gives rise to new surface functionalities, for example for the catalysis, with controlled adjustment of activity and selectivity, or else, for example, for conductive inks, pastes, etc.

The flexible surface modification also allows the bio-availability to be influenced. In addition, it is thus possible to control the release of metal ions. In addition, coverage with suitable dispersants or wetting agents can influence the persistence of the nanoparticles in the overall life cycle (for example easier agglomeration in wastewaters, easier degradation to harmless salts or complexes, etc.).

The metal nanoparticles obtained by the process according to the invention enable various uses, for example as coatings and/or plastics additives, as pigments, as catalysts, etc. This is still to be outlined in detail below.

The process according to the invention thus provides a purely aqueous synthesis of metal nanoparticles, more preferably noble metal nanoparticles, using suitable polymeric wetting agents or dispersants. The synthesis can be applied flexibly to different metals (e.g. silver, gold, etc.). The use of suitable wetting agents or dispersants allows the subsequent dispersibility in a wide variety of different media to be controlled. By adjusting the oxidation potential of the reducing agent and selecting a suitable stabilizer, it is also possible to produce nanoparticles of (oxidation-) sensitive metals.

The process according to the invention is additionally applicable flexibly to a multitude of metals. With the process according to the invention, it is possible to achieve much higher concentrations in dispersion of nanoparticles compared to the prior art. In addition, the process according to the invention uses exclusively inexpensive starting chemicals or reactants. Furthermore, the process according to the invention is also performable on the industrial scale and is thus upscaleable. Owing to the removability of the wetting agents or dispersants used, there are additionally no "dead" surfaces on the resulting metal nanoparticles.

The present invention further provides—in a second aspect of the invention—the metal nanoparticles obtainable by the process according to the invention.

In other words, the present invention, according to this aspect of the invention, relates to metal nanoparticles which comprise, on their surface, at least one polymeric stabilizer, especially a polymeric wetting agent and dispersant, or have been surface-modified and/or—coated with at least one polymeric stabilizer, especially a polymeric wetting agent or dispersant.

The inventive metal nanoparticles have excellent dispersion performance and can also be redispersed readily after isolation from the reaction mixture. More particularly, the inventive metal nanoparticles are dispersible both in aqueous and in organic media. In addition, the inventive metal nanoparticles are dispersible in polar and nonpolar solvents.

The dispersion properties of the inventive metal nanoparticles can be adjusted in a controlled manner or effectively tailored by the surface modification with the polymeric stabilizer.

For further details regarding the inventive metal nanoparticles, reference may be made to the above remarks regarding the process according to the invention, which apply correspondingly in relation to the inventive metal nanoparticles.

The present invention further provides—in a third aspect of the invention—for the inventive use of the metal nanoparticles according to the present invention.

For example, the inventive metal nanoparticles can be used as additives, pigments or fillers, especially for coatings, paints and plastics.

In addition, the inventive metal nanoparticles can be used as or in catalysts or catalyst systems.

Moreover, the inventive metal nanoparticles can also be used in coating materials and coating systems, especially coatings, paints and the like, in glasses and vitreous coatings, in inks including printing inks, in dispersions of all kinds, in plastics, in foams, in cosmetics, especially nail varnishes, in cleaning compositions and impregnating materials, in adhesives, in sealing compounds and in catalysts or catalyst systems, especially as additives, pigments or fillers.

In addition, the inventive nanoparticles can be used in optics and optoelectronics, and in electronics, electrical engineering and semiconductor technology. For example, the inventive metal nanoparticles can be used for increasing conductivities, especially of plastics, or else for production of printable circuits.

Moreover, the inventive metal nanoparticles may also find use in spectroscopy, especially in Raman spectroscopy, for example for the purposes of signal amplification.

It is equally possible to use the inventive metal nanoparticles in glass, ceramic and enamel production, for example in the production of windows (for example church windows), especially as pigments or dyes.

It is additionally possible to use the inventive metal nanoparticles in textile production, for example equally as pigments and/or dyes.

For further details regarding this aspect of the invention, reference may be made to the above details regarding the other aspects of the invention, which apply correspondingly in relation to this aspect of the invention.

The present invention further provides in a fourth aspect of the invention—dispersions which comprise the inventive metal nanoparticles in a carrier or dispersion medium.

For further details on this subject regarding this aspect of the invention, reference may be made to the above remarks regarding the other aspects of the invention, which apply correspondingly.

Finally, the present invention further provides—in a fifth aspect of the invention—coating materials and coating systems, especially coatings, paints and the like, plastics, foams, cosmetics, especially nail varnishes, adhesives, sealing compounds and catalyst systems, which comprise the inventive metal nanoparticles or the dispersions comprising them.

For further details regarding this aspect of the invention, reference may be made to the above remarks regarding the other aspects of the invention, which apply correspondingly in relation to this aspect of the invention.

Further configurations, modifications and variations, and also advantages, of the present invention are immediately recognizable and achievable by the person skilled in the art on reading the description, without leaving the scope of the present invention.

The working examples which follow serve merely to illustrate the present invention, without restricting it thereto.

WORKING EXAMPLES

Example 1

Production of Gold Nanoparticles by Means of Citrate Synthesis (Comparative, Prior Art)

Gold nanoparticles are produced by the method developed by Turkevich et al. by means of citrate synthesis as follows. 10 ml of an aqueous solution of $2.5 \cdot 10^{-4}$ mol/l $HAuCl_4 \cdot 3H_2O$ are heated to 95° C. Subsequently 417 µl of a 20 mmol/l trisodium citrate solution are added while stirring vigorously, whereupon the solution gradually changes color to red. The Au/citrate ratio is 0.3. The solution is left close to the boiling point for 15 minutes, then all of it is allowed to cool.

The example is repeated, except that 312 µl of a 20 mmol/l trisodium citrate solution are added, which corresponds to an Au/citrate ratio of 0.4.

The aforementioned Au/citrate ratios influence the resulting sizes of the Au nanoparticles obtained.

Example 2

Production of Silver Nanoparticles by Means of Biphasic Synthesis in the Presence of $NaBH_4$ as a Reducing Agent (Comparative, Prior Art)

9 mmol (1.53 g) of silver nitrate are dissolved in 300 ml of water in a 1 liter three-neck flask. In a beaker, 40 mmol (21.86 g) of tetra-n-octylammonium bromide are dissolved in 204 ml of $CHCl_3$.

Under an $N_2$ stream, the $CHCl_3$ solution is added to the silver nitrate solution. After approx. 1 minute, the $N_2$ stream is shut down. The $CHCl_3$ phase changes color to green and becomes cloudy. The water phase becomes milky, but does not contain any target product.

After stirring for 1 hour, the phases are separated in a phase separator. The $CHCl_3$ phase is returned to the 1 liter flask, and the water phase is discarded. Under an $N_2$ stream, 7.86 mmol (1.89 ml) of dodecanethiol are added and the mixture is stirred for 15 minutes. The $N_2$ stream is shut down after 1 minute.

In the meantime, 103 mmol (3.97 g) of sodium borohydride are dissolved in 2.40 ml of water. Subsequently, under an $N_2$ stream, the $NaBH_4$ solution is added gradually (within 2 to 3 minutes) since it foams vigorously. The reaction mixture is stirred at room temperature for 3 hours, and it turns dark brown/silvery after a certain time.

After 3 hours of reaction time, the phases are separated, and the aqueous phase is discarded. Subsequently, the $CHCl_3$ is drawn off on a rotary evaporator with a membrane pump at 30° C. and the residue in a flask is dried in an oil-pump vacuum in a desiccator overnight.

The powder thus obtained still has to be washed with ethanol to remove impurities and is then dispersible up to 0.2% in nonpolar solvents. The particle size is 10 nm, but has a coarse component (10%) of >100 nm.

The reaction is very sensitive and is not always reproducible.

Example 3A

Production of Silver Nanoparticles by the Process According to the Invention (Inventive)

First, a solution of 3.5 parts by weight of $AgNO_3$, 100 parts by weight of water, 7.2 parts by weight of a polymeric wetting agent or dispersant (e.g. Disperbyk® 2001 from BYK-Chemie GmbH, Wesel, Germany) and optionally 0.6 part by weight of a defoamer (e.g. BYK028 from BYK-Chemie GmbH, Wesel, Germany) ("Solution A") is prepared and stirred at room temperature. The result is a cloudy mixture.

In addition, a further solution ("Solution B") is prepared from 3 parts by weight of $NaBH_4$ and 50 parts by weight of water.

Solution B is added gradually to solution A at room temperature. This results in vigorous foaming and blackening. The result is a dispersion of Ag nanoparticles in water.

According to the end use, the resulting nanoparticles can either be extracted, for example, with PMA (methoxypropylacetate), which leads to nanoparticles of high purity which can be used, for example, for catalysis purposes, or else centrifuged, dried and redispersed (for example in PMA).

In a second batch, the preceding experiment is repeated, except with the difference that solution B is added rapidly to solution A, Rapid addition of solution B to solution A results in smaller nanoparticles. The addition rate can thus be used to control the particle size of the resulting nanoparticles as desired.

Example 3B

Production of Silver Nanoparticles by the Process According to the Invention (Inventive)

Example 3A is repeated, except with the difference that a different wetting agent (specifically: Disperbyk® 194 from BYK-Chemie GmbH, Wesel, Germany) is used. The Ag nanoparticles thus obtained are redispersible both in water and in PMA. This dispersion of Ag nanoparticles can thus be used directly as an additive, optionally after an appropriate processing and/or concentration step.

Example 3C

Production of Gold Nanoparticles by the Process According to the Invention (Inventive)

Analogously to example 3A, $HAuCl_4$ is used in place of $AgNO_3$. The result is the corresponding Au nanoparticles.

Example 3D

Reduction of $AgNO_3$ in Water Without the Presence of a Wetting Agent or Dispersant (Comparative)

Example 3A is repeated, except with the difference that no wetting agent or dispersant is used as a stabilizer. No Ag nanoparticles are formed, and reaction continues instead to give an Ag sludge.

Example 4

Study of the Temperature Dependence of the Process According to the Invention (Inventive)

The temperature dependence of the process according to the invention is studied in different batches. The results are reproduced in the following table:

| Batch number | T [° C.] | Properties | Dist. water | Ethyl acetate | PMA | 1,3-propane-diol |
|---|---|---|---|---|---|---|
| Ex. 4A | 10 | dispersibility | good | good | good | good |
| Ex. 4B | 20 | dispersibility | good | good | good | good |
| Ex. 4C | 40 | dispersibility comments | Not dispersible sediment dark brown, supernatant colorless | good a silver mirror forms on the glass bottle wall | good | low dispersibility dark brown sediment, supernatant is light brown |
| Ex. 4D | 60 | dispersibility comments | not dispersible sediment brown, supernatant colorless | good a silver mirror forms on the glass bottle wall | good | not dispersible sediment brown, supernatant colorless |
| Ex. 4E | 80 | dispersibility comments | not dispersible sediment brown, supernatant colorless | good a silver mirror forms on the glass bottle wall | good | not dispersible sediment brown, supernatant colorless |

It is found that the silver particles produced at temperatures up to 40° C. have much better redispersibilities in polar solvents, such as water and 1,3-propanediol. The dispersion performance in ethyl acetate is at first good in all experiments, but the dispersions of the nanoparticles from 60° C. have a lower stability in ethyl acetate, which is illustrated by formation of a silver mirror on the glass wall. Redispersibility in PMA is equally good at all temperatures.

By varying the reaction temperature, it is thus possible to influence the polarity of the particle surface and the dispersibility in different solvents. In addition, this offers options for removal of the silver particles from the reaction mixture.

The formation of a silver mirror can also be used advantageously for mirror coating or formation of conductive layers. The destabilization has the effect that the particles come closer together, and possibly that of a plasmon transfer.

The invention claimed is:

1. A process for producing metal nanoparticles,
   wherein through a reduction process, metal ions are reduced by means of at least one reducing agent in the presence of at least one polymeric stabilizer and converted to metal nanoparticles;
   wherein the reduction process is performed in a liquid medium as a single phase reaction and wherein the regulation of temperature and/or volume flows achieves a separation in time and/or space of the nucleation and growth processes of the resulting metal nanoparticles, wherein the process for producing metal nanoparticles is performed with a reaction time in the range from 0.0001 to 10 minutes; and within a temperature range of 10 to 40° C.;
   wherein the polymeric stabilizer has a weight-average molecular weight of at least 1,000 g/mol and is based on an acid- and/or base-functionalized polymer having polar functional groups and is selected from the group consisting of functionalized polyamines, functionalized polyurethanes, functionalized poly(meth)acrylates, functionalized polyether/polyester copolymers, functionalized polyethers, functionalized polyesters, functionalized fatty acid copolymers, functionalized block copolymers and functionalized polyalkoxylates and mixtures or combinations of at least two of these compounds; and
   wherein the polymeric stabilizer is used in amounts of 20 to 100% by weight, based on the resulting metal nanoparticles.

2. The process as claimed in claim 1, wherein the process is performed additionally in the presence of at least one defoamer in amounts of 0.0001 to 5% by weight, based on an overall reaction mixture which includes the at least one defoamer.

3. The process as claimed in claim 1, wherein the process is performed additionally in the presence of at least one additive selected from the group consisting of Ph modifiers, Ph buffer substances, emulsifiers, rheology modifiers, preservatives, surfactants and mixtures thereof.

4. The process as claimed in claim 1, wherein at least one cosolvent has been added to the reaction mixture in amounts of 0.01 to 10% by weight, based on an overall reaction mixture which includes the at least one cosolvent.

5. The process as claimed in claim 1, wherein the process is performed within the temperature range of 10 to 30° C.

6. The process as claimed in claim 1, wherein the process is performed with a reaction time in the range from 0.0001 to 5 minutes.

7. The process as claimed in claim 1, wherein the reducing agent is soluble or dispersible in the reaction medium and is selected such that it is capable of reducing the metal ion to elemental metal in the oxidation state zero and/or such that the reducing agent in the electrochemical voltage series possesses a lower standard potential than the metal of the metal ion to be reduced.

8. The process as claimed in claim 1, wherein the reducing agent is selected from the group consisting of inorganic hydrides; inorganic thiosulfates or thiosulfuric acid; inorganic sulfides or hydrogen sulfide; inorganic sulfites; hydrazines; hydroxylamines; hydrogen; carbon monoxide; acetylene; oxalic acid or oxalates; citric acid or citrates; tartaric acid or tartrates; mono or polyhydric alcohols; hydroxy-functional ethers and polyglycol ethers; sugars; inorganic phosphides; and mixtures or combinations of at least two of the aforementioned reducing agents.

9. The process as claimed in claim 1, wherein the reducing agent is used in a ratio of reducing agent to metal ions, calculated as the amount of electrons required for the reduction, in the range from 1.05:1 to 200:1.

10. The process as claimed in claim 1, wherein the metal nanoparticles obtained have absolute particle sizes in the range from 0.3 to 1,000 nm.

11. The process as claimed in claim 1, wherein the metal nanoparticles obtained have mean particle sizes (D50) in the range from 1 to 500 nm.

12. The process as claimed in claim 1, wherein the polymeric stabilizer has a weight-average molecular weight in the range from 1,250 to 100,000 g/mol and is based on a functionalized polymer, said polymer containing at least one functional group selected from the group consisting of hydroxyl (—OH), thiol (—SH), amine, ammonium, carboxyl, carbonyl, ester, ether, sulfonyl, phosphoric acid and phosphoric ester functions.

\* \* \* \* \*